April 30, 1968 W. FISCHER 3,380,334

OPTICAL SCANNING SYSTEM USING SPECULAR REFLECTIONS

Filed Oct. 29, 1963

INVENTOR

William Fischer

BY Joseph A. Genovese & Max L. Libman

ATTORNEYS

United States Patent Office 3,380,334
Patented Apr. 30, 1968

3,380,334
OPTICAL SCANNING SYSTEM USING SPECULAR REFLECTIONS

William Fischer, Silver Spring, Md., assignor, by mesne assignments, to Control Data Corporation, Minneapolis, Minn., a corporation of Minnesota Filed Oct. 29, 1963, Ser. No. 319,778
2 Claims. (Cl. 88—1)

ABSTRACT OF THE DISCLOSURE

An optical scanning system which relies upon specularly reflected light for an ordinary scanner to distinguish between a desired information trace, e.g. a curve, and undesired marks such as graph lines on the same surface (e.g. graph paper) as the information trace.

In cases where the surface and marks thereon exhibit similar or substantially similar specular reflection characteristics and the information trace does not, an optical system is arranged to form an image of the trace and its background primarily from specular reflections from the surface and marks. This entails selection of the angularity of the axis of a light source and an image forming lens with respect to the surface. Such an image will contain the dark information trace but not the marks owing to the specular reflections therefrom. Accordingly, that image containing only the dark information trace on a comparatively bright background is examined by a conventional scanner.

This invention relates to scanning systems, and particularly to systems for scanning information on a glossy surface by using specular reflection from the surface to provide a high degree of contrast between the information and its background.

Rays of light falling upon a surface are reflected, absorbed, or transmitted and perhaps refracted according to the nature of the substance of which the surface is composed. The amount of light reflected from a particular surface depends, among other things, on (a) the color of the surface, (b) the wave length of incident rays, (c) the angle of incidence, and (d) the nature of the surface. Thus, the reflection factor of a surface is a function of several variables, and two of them, (c) and (d) above, have a direct bearing on my invention.

A polished or glossy surface is capable of reflecting a large percentage of light where the angle of reflection is equal to the angle of incidence. A polished or glossy surface so arranged in an optical system is said to be specular, and it is specular owing to a high percentage of the light being reflected from the top layer of the surface. Thus, even if a surface is "black," (a) above, and otherwise capable of absorbing a considerable quantity of light, when arranged for specular reflection, the "black" surface reflects a high percentage of the incident light from a light source.

Glossy pages of a magazine often cause a "glare" to the eye when accidentally tilted so that the angles to the light source and to the eye are equal. When the page is so positioned, the page and the print (usually black) reflect a high percentage of the light. If the page surface and the surface of the printed character were rough, the above effect would be greatly reduced.

There are some information-extracting tasks, using optical systems, where it is impossible to distinguish between the desired information and the information-background by relying on usual scanning techniques. The usual technique is to form an optical image of the surface having the information, and to scan the image. The J. Rabinow Patent No. 2,933,246 discloses a typical optical system used in optical character reading machines. In that patent, the information bearing surface is assumed to contrast with the information (characters), and there is no extraneous background data, lines, marks, etc. to confuse the machine. However, in the case of a curve on graph paper, the ordinary scanning system has no means by which to exclude the graph lines. The graph lines can be excluded by other means, e.g. as disclosed in the Rabinow Patent No. 3,201,752, but at the expense of additional logic circuits and components, and sometimes the loss of some of the information. In many applications the loss of information is intolerable, e.g. in examining medical graphic records, geological records including seismographs, scientific records and others.

A specific object of my invention is to provide a scanning system for a document, which overcomes the above problems by using specular reflection as discussed later.

A general object of my invention, is to provide a scanning system to examine any kind of information, including curves, characters, contours, patterns, etc. where the information is distinguishable from its background by the use of a specular reflection system.

My scanning system includes a light source and a conventional scanner arranged in an angular relationship with the surface of the information bearing medium such that the surface is specular, and the image formed on the scanner is due to specular reflection from the surface. In many cases, surfaces such as graph paper, a printed glossy page, etc. will specularly reflect light from the top layer of the entire area (including the print, graph lines etc.). Now, if the information (curves, characters, etc.) on the graph paper is at a different level from the surface upper layer and/or of a different texture, and/or is not specular at the same angles as the surface, the information will diffuse the light falling thereon and/or absorb more of the light so that the information will appear "dark" in the over-all specular reflection image. Thus, it can be scanned, and the information extracted from the image, to the exclusion of the graph lines, or other background "noise."

An excellent example of the accomplishment of my invention is in scanning the curve on graph tape of the kind where the curve is formed by a heated stylus. This tape is composed of a ply of paper, a layer of ink, dye or the like (usually black), and a wax-like, glossy, white plastic coating over the ink layer. The coating has graph lines (often black like the information curve) printed thereon. The hot stylus forms a curve on the tape by heat and pressure on the coating, causing the ink to migrate into the plastic and/or the coating to be removed and/or the coating to combine with the ink along the trace of the stylus. Owing to changes in pressure and temperature of the stylus (and other reasons) the curve is not uniformly wide or dark. In fact, to the observer, parts of the curve appear lighter than the graph lines. With the usual optical image forming methods used in reading, mark sensing, etc. machines, there is no way, to my knowledge, for the scanner to distinguish the curve from the graph lines. With my invention, however, the curve stands out as a dark trace in a specular-reflection image, and the background including the graph lines appears as a homogenous, bright area, and the image of the curve can be "seen" by a scanner.

Other objects and features will become evident in following the description of the illustrated forms of my invention.

Figures 3, 3A:
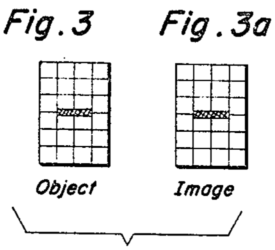

FIGURES 3 and 3*a* are views showing an object on a graph background and its direct image.

Figures 4, 4A:
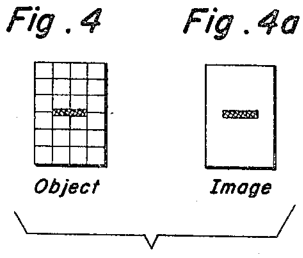

FIGURES 4 and 4*a* are views showing the same object and background, with the image showing the background as it will appear due to specular reflection.

Figure 5:
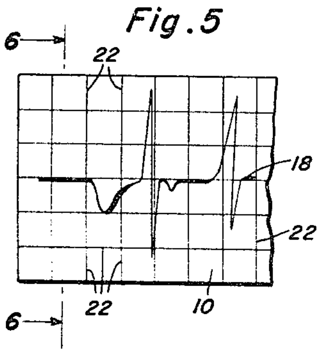

FIGURE 5 is a view of a graph with a curve thereon presenting a scanning problem which my invention solves.

Figure 6:
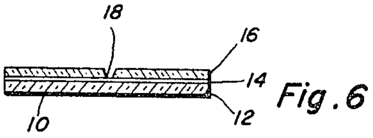

FIGURE 6 is a greatly enlarged sectional view taken on the line 6—6 of FIGURE 5.

As discussed before, a lens used in the ordinary manner will faithfully produce an image of an object including its background. For instance, the object in FIGURE 3 is a black horizontal rectangle on a white sheet of graph paper having the usual printed graph lines. FIGURE 3*a* shows the image of the object and its background. For all practical purposes FIGURES 3 and 3*a* appear identical.

However, an optical system (FIGURES 1 and 2, for example) can be arranged in a manner such that an image (FIGURE 4*a*) can be formed of an object (FIGURE 4), wherein the background (graph paper surface) appears bright, and the graph lines are excluded from the background. This enables me to use a simple scanner and any conventional logic circuitry in a machine for examining, encoding, identifying, etc. the object.

As discussed, specular reflection is a surface phenomenon by which a large percentage of the light rays incident to the surface are reflected in a manner such that the light source seems to be behind the surface, and the rays seem to be directed toward the viewer. Thus, the surface (or portions thereof) at the proper angle for a high degree of specular reflection produces a bright image.

As applied to a specific case, a large number of recordings are made on a special medium 10 (FIGURE 1) by the heated stylus method. The medium is usually a tape (FIGURES 5 and 6) which is typically a laminate of paper 12, a layer 14 of ink or dye, and a wax-like glossy coating 16 (usually a plastic) on the ink. The recorder (not shown) has a heated stylus lightly pressed against the coating 16, and as X and Y coordinate motion is imparted to the stylus and tape, typical curve 18 is formed on and/or in the tape by mechanical and/or chemical action. As can be observed, the plastic coating 16 is either melted along the trace of the curve and/or it allows the ink to migrate into the trace when heated. Tape such as this is commercially available, and although I do not know what is the precise behavior of the tape under the influence of heat and pressure, simple tests show that the coating 16 and layer 14 are separately sensitive to both heat and pressure. As far as my invention is concerned, the important thing is that the reflectance of the curve 18 is greatly different from not only the surface of coating 16 but also the graph lines 22.

The graph lines are necessary for visual reading and interpretation of curve 18. However, for machine reading the graph lines are a great hindrance. Not only do they require bandwidth if they are optically scanned and interpreted, but also they are likely to be confused with curve 18 which is the information on the tape. The confusion can be intolerable when, for example, the curve is as narrow or narrower than a graph line and/or less dense ("black") than a graph line. In instances where data pertaining to curve 18 is to be transmitted, e.g. over transmission lines, telephone lines, etc. they will waste a considerable amount of bandwidth. Therefore, my invention provides a solution to this problem by forming and presenting an image of curve 18 and its background to the scanner in a way that the background of the curve is bright and has none (or substantially none) of the graph lines 22 therein. If I want to scan a few graph lines for reference, such as the top and bottom lines, I merely have to illuminate them by other (non-specular) light means, and these graph lines become visible to the scanner.

Figure 1:
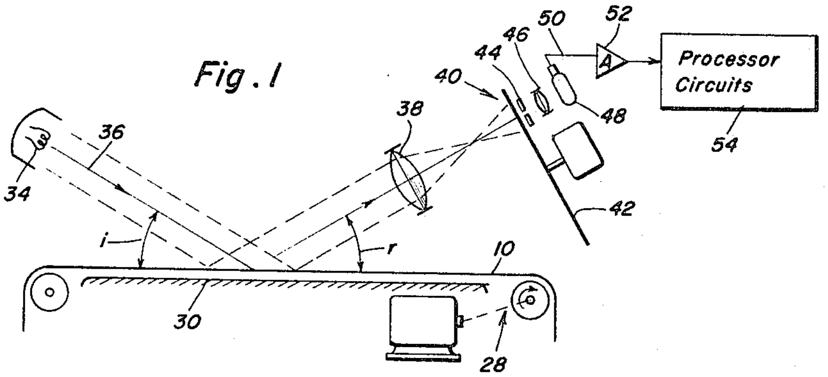
FIGURE 1 is a schematic side view showing one form of my invention.

Attention is directed to FIGURE 1 showing a tape 10 moved over flat support 30 by a conventional transport 28 represented by a pair of rollers and a motor. Light source 34, is a lamp with a reflector to direct the essentially parallel light rays toward the surface of tape 10. The generally parallel rays 36 have an angle *i* of incidence equal to the angle *r* of reflection. The reflected light is gathered by lens 38 which forms an image on one face of scanner 40. The illustrated scanner is made of a motor-operated slotted scanning disc 42 with a fixed slotted member 44, lens 46 and photocell 48 behind the disc. The scanner is not shown in detail because it is conventional. Scanner 40 can just as easily be a row of photocells as in Patent No. 3,104,369. A cathode ray tube (or other) flying spot source of light as in Rabinow 2,933,246, may be used or any other scanner capable of providing scan lines (or the equivalent transverse to the direction of movement of the tape image. In the embodiment shown the scanning procedure entails moving tape 10 by the transport 28, while the optical system including the light source 34 and lens 38 forms an image on one face of scanning disc 42. As the disc rotates its slots cooperating with the fixed slotted member 44 form scan lines across the tape image, allowing the photocell 48 to provide outputs on line 50 which are amplified at 52 and conducted to processor 54. The processor is selected and/or designed in accordance with the ultimate objective of the system. For instance in the case of a curve 18, processor 54 can include a digitizer to provide binary outputs describing the coordinate positions of the curve at each scan-line intersection thereof. For other kinds of information, processor 54 is selected and/or designed to be compatible with the system.

Figure 2:
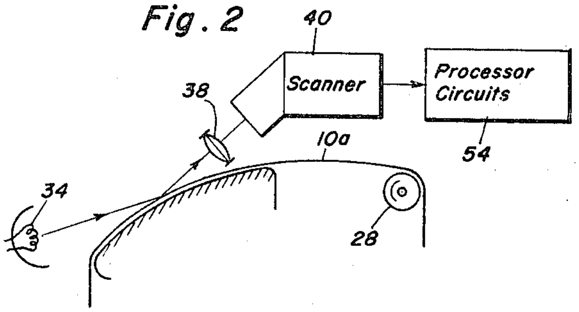
FIGURE 2 is a side view showing another embodiment.

FIGURE 2 illustrates a system similar to FIGURE 1 except for the tape support **30*a*** which is curved, making it more convenient to obtain smaller angles of incidence and reflectance in the optical system. There is no single best angle which yields a highly specular image in all applications. The best angle will vary as a function of several variables, among which are the material of the surface of the medium, its smoothness, the kind of light (e.g. the percentage of long and short wave-length components), etc. For tape such as shown in FIGURE 5 and defined herein, the image is highly specular when angles *i* and *r* (FIGURE 1) are approximately 30°. A simple method (and accurate enough) of selecting the most advantageous angle for highest specular reflection is to use a simple light meter to measure the reflected light over a range of angles, and select the most favorable angle.

Numerous changes and modifications may be made without departing from the protection of the following claims.

I claim:

1. In a scanning system for a light-reflecting surface containing a mark both of which are specularly reflective and an information trace having a surface quality different from said reflecting surface and said mark, the improvement comprising a light source directed toward said surface at a predetermined first angle thereto, image forming means having an optical axis arranged at a second predetermined angle to said surface, said first and said second angles being such with respect to said mark on said surface that the image is formed by said means by specular reflections from said surface and mark so that said mark is substantially optically indistinquishable from said surface while the reflections from said trace are diffuse and hence optically distinguishable from the specular reflections from said surface and said mark, an optical scanner optically aligned with the image formed by said image forming means to transversely scan said image and provide electrical signals corresponding to the surface and the information trace respectively, and processor means responsive to said signals to provide outputs relating to said information trace.

2. In a scanning system for a light reflecting surface providing a background and having a visual information trace together with a visual mark thereon and wherein said background and said mark both of which are specularly reflective at a given angle with respect to the rays from a light source, and said trace diffuses light at said angle; the combination of a light source directed toward said surface at said given angle relative thereto to provide specular reflections from said background and said mark and diffuse reflections from said trace along an axis at a predetermined angle of reflectance therefrom, and an optical scan device having photosensitive means and optically aligned with said axis for transversely scanning said surface by examination of said specular and diffuse reflections with the result that the specular reflections eminating from both the mark and background are indistinguishable by the scan device while the diffuse reflections are distinguishable by the scan device from both the mark and the background.

References Cited

UNITED STATES PATENTS

| | | | |
|---|---|---|---|
| 2,565,266 | 8/1951 | Potts | 250—219 |
| 3,018,471 | 1/1962 | Kamentsky. | |
| 3,076,957 | 2/1963 | Hankes et al. | |
| 3,166,675 | 1/1965 | Pedden et al. | 250—219 |
| 3,179,810 | 4/1965 | Wadey | 250—219 |
| 3,192,390 | 6/1965 | Ressler | 250—219 |
| 3,229,273 | 1/1966 | Baaba et al. | 88—10 XR |

JEWELL H. PEDERSEN, *Primary Examiner.*

O. B. CHEW, *Assistant Examiner.*